US007423218B2

(12) United States Patent
Konda

(10) Patent No.: US 7,423,218 B2
(45) Date of Patent: Sep. 9, 2008

(54) DIGITAL SIGNAL TRANSMISSION CABLE AND DIGITAL VIDEO DISPLAY SYSTEM

(75) Inventor: Hideya Konda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 169 days.

(21) Appl. No.: 11/399,691

(22) Filed: Apr. 7, 2006

(65) Prior Publication Data

US 2006/0258216 A1 Nov. 16, 2006

(30) Foreign Application Priority Data

Apr. 13, 2005 (JP) ............................. 2005-116217

(51) Int. Cl.
*H02G 15/02* (2006.01)

(52) U.S. Cl. .................................................... 174/74 R

(58) Field of Classification Search ............... 174/74 R, 174/75 R, 77 R, 84 R, 84 S, 86, 88 R, 92; 439/502, 638, 289, 362, 607–610, 701
See application file for complete search history.

(56) References Cited

U.S. PATENT DOCUMENTS 6,039,611 A * 3/2000 Yang .......................... 439/701
6,447,339 B1 * 9/2002 Reed et al. .................. 439/638
6,716,057 B1 * 4/2004 Wu ............................ 439/497
6,940,477 B2 9/2005 Moon et al.
7,118,411 B2 * 10/2006 Huang et al. ................ 439/502
2003/0064625 A1 * 4/2003 Ozai .......................... 439/579
2004/0158662 A1 8/2004 Konda et al.
2006/0239310 A1 * 10/2006 Salz ...................... 372/29.021

FOREIGN PATENT DOCUMENTS

EP 1 445 951 A * 8/2004
JP 2002-366340 A 12/2002

OTHER PUBLICATIONS

Pacific Custom Cable Inc, HDMIDVI 1 Meter HDMI Male to DVI Male Digital Cable; Jan. 2001, www.PacificCable.com.*
Optics, Stretch HDMI; Jan. 2005; pp. 1-1-1-8.*
Sandberg, HDMI 19 Male/DVI Male Gold Plated Molded Type Data Sheet; Feb. 2006.*

* cited by examiner

*Primary Examiner*—William H Mayo, III
(74) *Attorney, Agent, or Firm*—Global IP Counselors, LLP

(57) ABSTRACT

A digital signal transmission cable and digital video display system are configured to transmit digital signals over long distances. The digital signal transmission cable has a first metal wire and a male digital visual interface connector that is mounted to one end of the first metal wire and equipped with a compensation circuit. The compensation circuit is configured to shape and amplify digital signals that propagated through the first metal wire. The digital video display system has a digital signal transmission cable and an image input device and an image output device that are connected by the digital signal transmission cable.

15 Claims, 12 Drawing Sheets

DIGITAL SIGNAL TRANSMISSION CABLE AND DIGITAL VIDEO DISPLAY SYSTEM

BACKGROUND OF THE INVENTION

1. Field of the Invention

The present invention relates to a digital signal transmission cable and a digital video display system that uses the digital signal transmission cable.

2. Description of the Background Arts

With the marked popularity of personal computers and liquid crystal displays, the number of image transmission technologies employing digital signals instead of conventional analog signals has increased. One of the newer digital signal technologies is the digital visual interface (DVI). Currently, the scope of use of DVI technology and products and devices that utilize DVI technology are being developed. Digital signal transmission cables employing DVI technology include metal wire cables that have a transmission range of several meters or optical fiber cables that eliminate the transmission range limitations of metal wires and can transmit over large distances (e.g., see Japanese Published Unexamined Patent Application No. 2002-366340).

Digital signal transmission cables employing DVI technology are used chiefly to connect personal computers to display devices and projectors. Until recently, a problem of signal degradation resulting from the distance of transmission and the existence of intermediate connection components was not particularly large because the devices were seldom placed far apart from each other. However, in recent years the environments in which digital images are displayed have changed greatly. The locations from which images are displayed have become more diverse, e.g., the showing of movies and other video footage in large venues and the displaying of advertisements using wall-mounted displays, and it has become necessary to arrange image output devices in positions that are remote from the positions of image input devices. Furthermore, unlike the past when computer screens were used to display chiefly text, computers are now used for displaying photographs, viewing moving pictures (e.g., video), and other applications that demand higher image quality. Consequently, issue of preventing signal degradation has become extremely important.

As compensation technologies related to DVI technology, technologies for shaping and amplifying transmitted signals have been developed as device components. These compensation technologies have typically involved shaping a signal that has propagated along a digital signal transmission cable and then amplifying the signal with an amplification circuit. As DVI specification itself spreads, dedicated LSI circuits (IC chips) were developed to support DVI. One such LSI circuit is the MAX3815 made by the U.S.-based company Maxim Integrated Products, Inc. However, the MAX3815 is designed solely to be installed inside a projector or other image output device. Consequently, it is not preferable in view of preventing signal degradation to use a projector, liquid crystal display, or other image output device that is not provided with such an LSI chip when such projector, liquid crystal display, or other image output device is positioned distantly with respect to the personal computer, the digital virtual disk (DVD) player or other image input device.

SUMMARY OF THE INVENTION

The object of the present invention is to provide a digital signal transmission cable and a digital video display system capable of accomplishing good transmissions of digital signals over long distances even when an image output device not provided with an internally installed compensation circuit for shaping and amplifying digital signals is used.

In order to achieve the object, the present invention provides a digital signal transmission cable having (1) a first metal wire; and (2) a first male DVI (digital visual interface) connector compliant with Digital Display Working Group's DVI standard that is mounted to one end of the first metal wire and equipped with a compensation circuit configured to shape and amplify digital signals that propagated through the first metal wire.

Another aspect of the present invention provides a digital video display system having (1) a digital signal transmission cable according to the present invention provided with a first male high definition multimedia interface (HDMI) connector on one end and a first male DVI connector equipped with a compensation circuit on the other end; (2) an image input device provided with a female HDMI receptacle configured to connect to the first male HDMI connector; and (3) an image output device provided with a female DVI receptacle configured to connect to the first male DVI connector.

Additionally, the present invention provides a digital video display system having (1) a digital signal transmission cable according to the present invention provided with a second male DVI connector on one end and a first male DVI connector equipped with a compensation circuit on the other end; (2) an image input device provided with a female DVI receptacle configured to connect to the second male DVI connector; and (3) an image output device provided with a female DVI receptacle configured to connect to the first male DVI connector.

The present invention also provides a digital video display system having (1) a digital signal transmission cable according to the present invention provided with a first male HDMI connector on one end, a second male HDMI connector on the other end, and a male DVI connecting device equipped with a compensation circuit at a position between the first and second male HDMI connectors; (2) an image input device provided with a female HDMI receptacle configured to connect to the first male HDMI connector; and (3) an image output device provided with a female HDMI receptacle configured to connect to the second male HDMI connector.

The present invention also provides a digital video display system having (1) a digital signal transmission cable according to the present invention provided with a second male DVI connector on one end, a male HDMI connector on the other end, and a first male DVI connector equipped with a compensation circuit at an intermediate position; (2) an image input device provided with a female DVI receptacle configured to connect to the first male DVI connector; and (3) an image output device provided with a female HDMI receptacle configured to connect to the male HDMI connector.

Still another aspect of the present invention provides a connecting device with one end thereof being configured to connect to a receptacle of an image output device either directly or via a separate cable and the other end thereof being configured to connect to a receptacle of an image input device either directly or via a separate cable, the connecting device including at least an interface that is compliant with the DVI standard and has a compensation circuit configured to shape and amplify digital signals.

BRIEF DESCRIPTION OF THE DRAWING

These and other features, aspects, and advantages of the present invention will become better understood upon reviewing the following description, appended claims, and accompanying drawings where:

DETAILED DESCRIPTION OF THE INVENTION

Figure 5A:
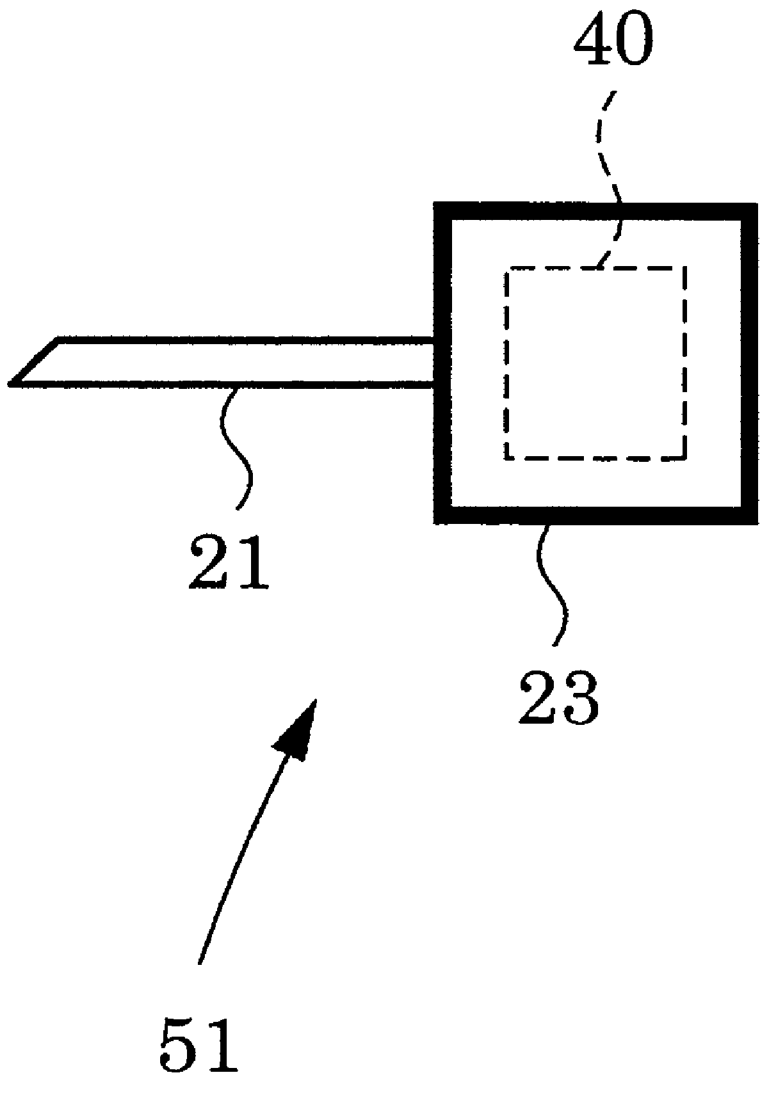
FIG. 5A to 5D are schematic diagrams of embodiments of a digital signal transmission cable according to the present invention.

FIG. 5A is a schematic diagram of a first embodiment of a digital signal transmission cable according to the present invention. A digital signal transmission cable 51 has a first metal wire 21 and a first male digital visual interface (DVI) connector 23 compliant with Digital Display Working Group's DVI standard that is mounted to one end of the first metal wire 21 and equipped with a compensation circuit 40 configured to shape and amplify digital signals that propagated through the first metal wire 21.

Figure 2:
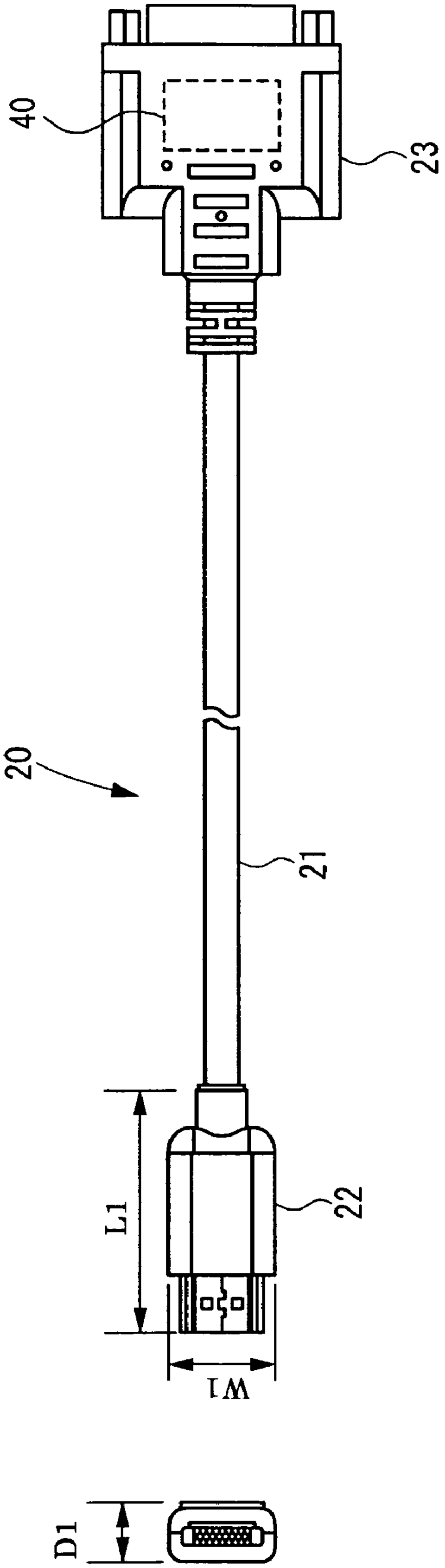
FIG. 2 is a schematic diagram of a digital signal transmission cable 20, which is an embodiment of a digital signal transmission cable according to the present invention and shown in FIG. 1.

FIG. 2 is a schematic diagram of a second embodiment of a digital signal transmission cable according to the present invention. A digital signal transmission cable 20 is the same as the digital signal transmission cable 51 except that the digital signal transmission cable 20 has a first male high definition multimedia interface (HDMI) connector 22 compliant with HDMI standard is mounted to the other end of the first metal wire 21.

The digital signal transmission cables 51 and 20 are configured such that a digital signal that has become distorted and/or attenuated while propagating from the other end of the metal wire (i.e., from the first male HDMI connector 22 in the case of the digital signal transmission cable 20) can be corrected with a compensation circuit 40 such that the original waveform and level of the signal are restored. Consequently, digital signals can be transmitted over long distances in a satisfactory fashion even when using a projector, liquid crystal display, or other image output device that does not have an internal LSI circuit for signal shaping and amplification.

Figure 5B:
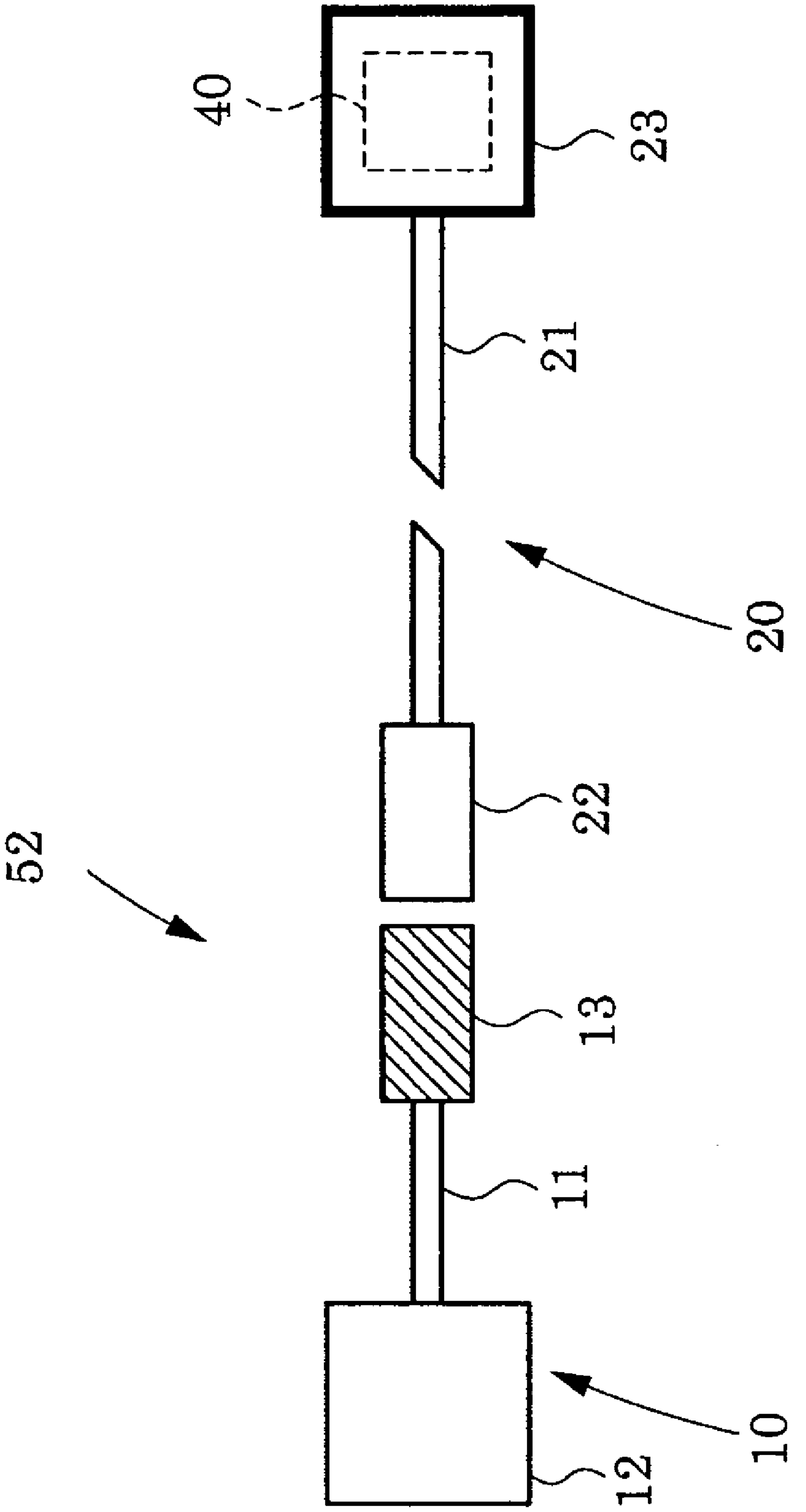

FIG. 5B is a schematic diagram of a third embodiment of a digital signal transmission cable according to the present invention. A digital signal transmission cable 52 is the same as the digital signal transmission cable 20 except that the digital signal transmission cable 52 also has a first DVI/HDMI conversion cable 10 that is connected to the first male HDMI connector 22. The first DVI/HDMI conversion cable 10 comprises a second metal wire 11, a male DVI connector 12 mounted to one end of the second metal wire 11, and a female HDMI connector 13 that is compliant with the HDMI standard and mounted to the other end of the second metal wire 11. The female HDMI connector 13 is connected to the first male HDMI connector 22 of the digital signal transmission cable 20.

Figure 5C:
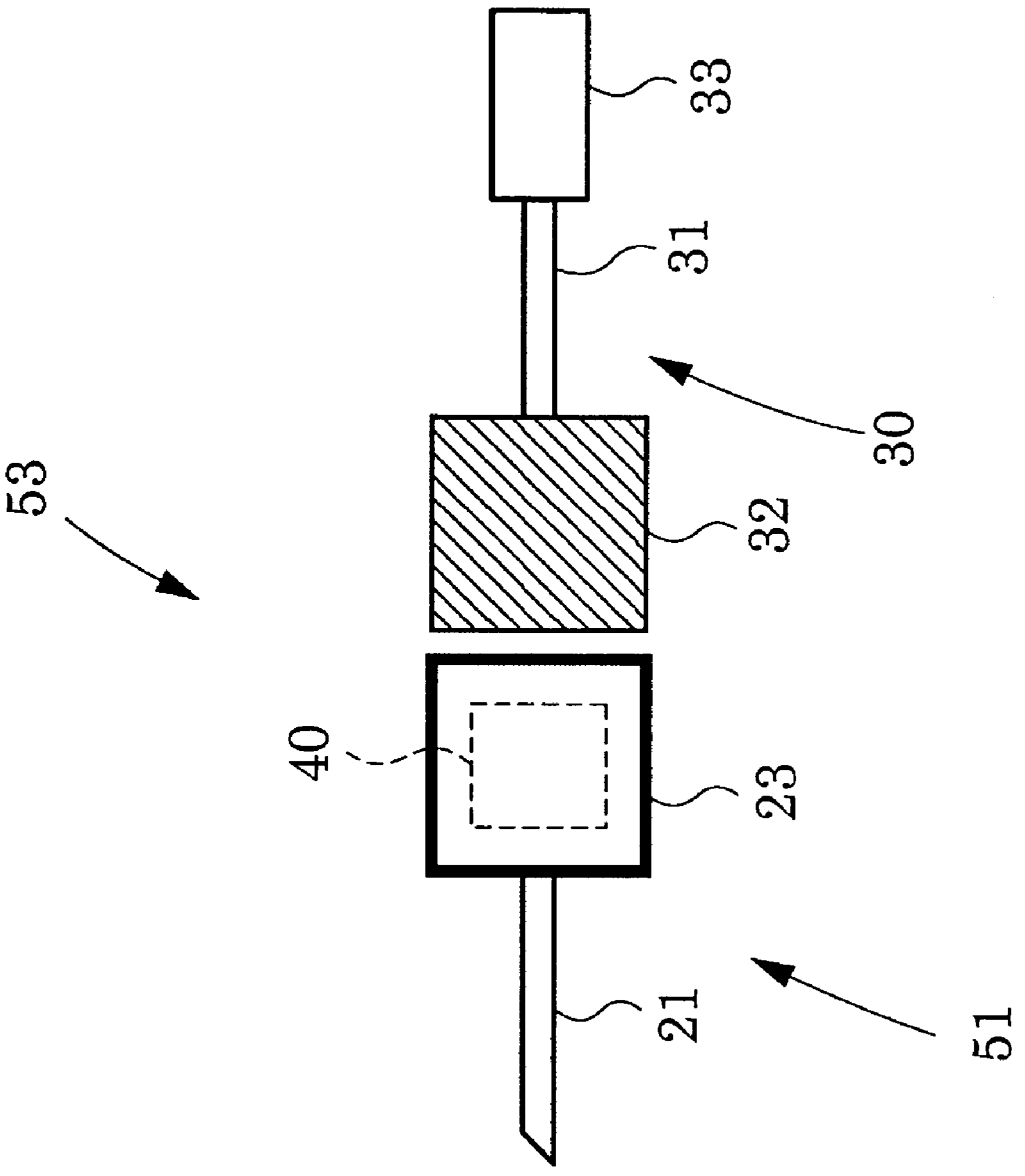

FIG. 5C is a schematic diagram of a fourth embodiment of a digital signal transmission cable according to the present invention. A digital signal transmission cable 53 is the same as the digital signal transmission cable 51 except that the digital signal transmission cable 53 also has a second DVI/HDMI conversion cable 30 that is connected to the first male DVI connector 23 equipped with the compensation circuit 40. The second DVI/HDMI conversion cable 30 comprises a third metal wire 31, a second male HDMI connector 33 mounted to one end of the third metal wire 31, and a female DVI connector 32 that is compliant with the DVI standard and mounted to the other end of the third metal wire 31. The female DVI connector 32 is connected to the first male DVI connector 23 of the digital signal transmission cable 51.

Figure 5D:
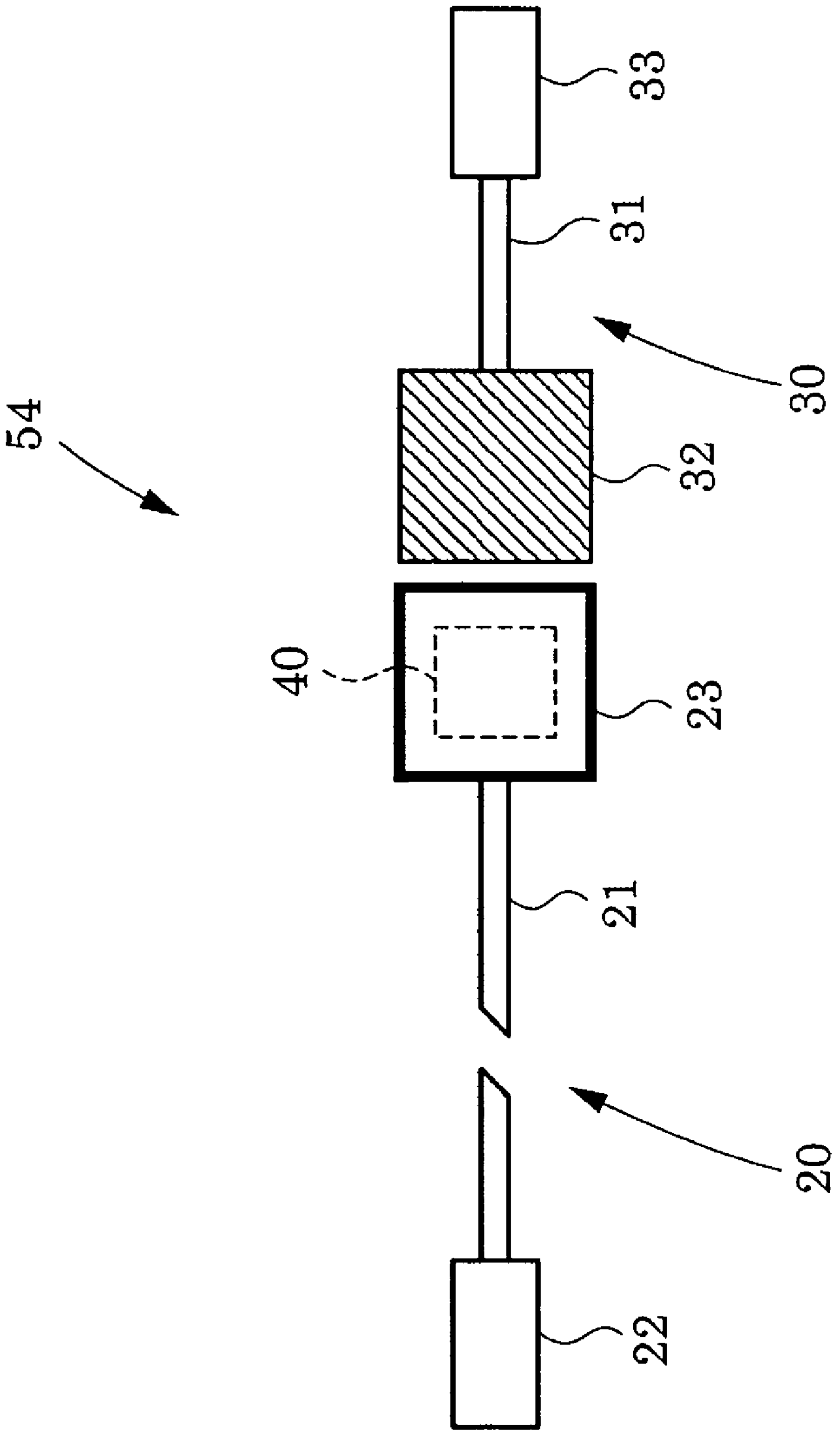

FIG. 5D is a schematic diagram of a fifth embodiment of a digital signal transmission cable according to the present invention. A digital signal transmission cable 54 is the same as the digital signal transmission cable 20 except that the digital signal transmission cable 54 also has the second DVI/HDMI conversion cable 30 that is connected to the first male DVI connector 23 equipped with the compensation circuit 40. The second DVI/HDMI conversion cable 30 comprises a third metal wire 31, a second male HDMI connector 33 mounted to one end of the third metal wire 31, and a female DVI connector 32 that is compliant with the DVI standard and mounted to the other end of the third metal wire 31. The female DVI connector 32 is connected to the first male DVI connector 23 of the digital signal transmission cable 20.

The digital signal transmission cable 52 can be connected to a personal computer, a DVD player, or other image input device equipped with a female DVI receptacle. The digital signal transmission cables 53 and 54 can be connected to a projector, liquid crystal display, or other image output device equipped with a female HDMI receptacle. Any of these cables serves to correct distortion and attenuation of digital signals and enables a clear image to be displayed without image quality deterioration even when the image output device and image input device are arranged distantly from each other.

Figure 6A:
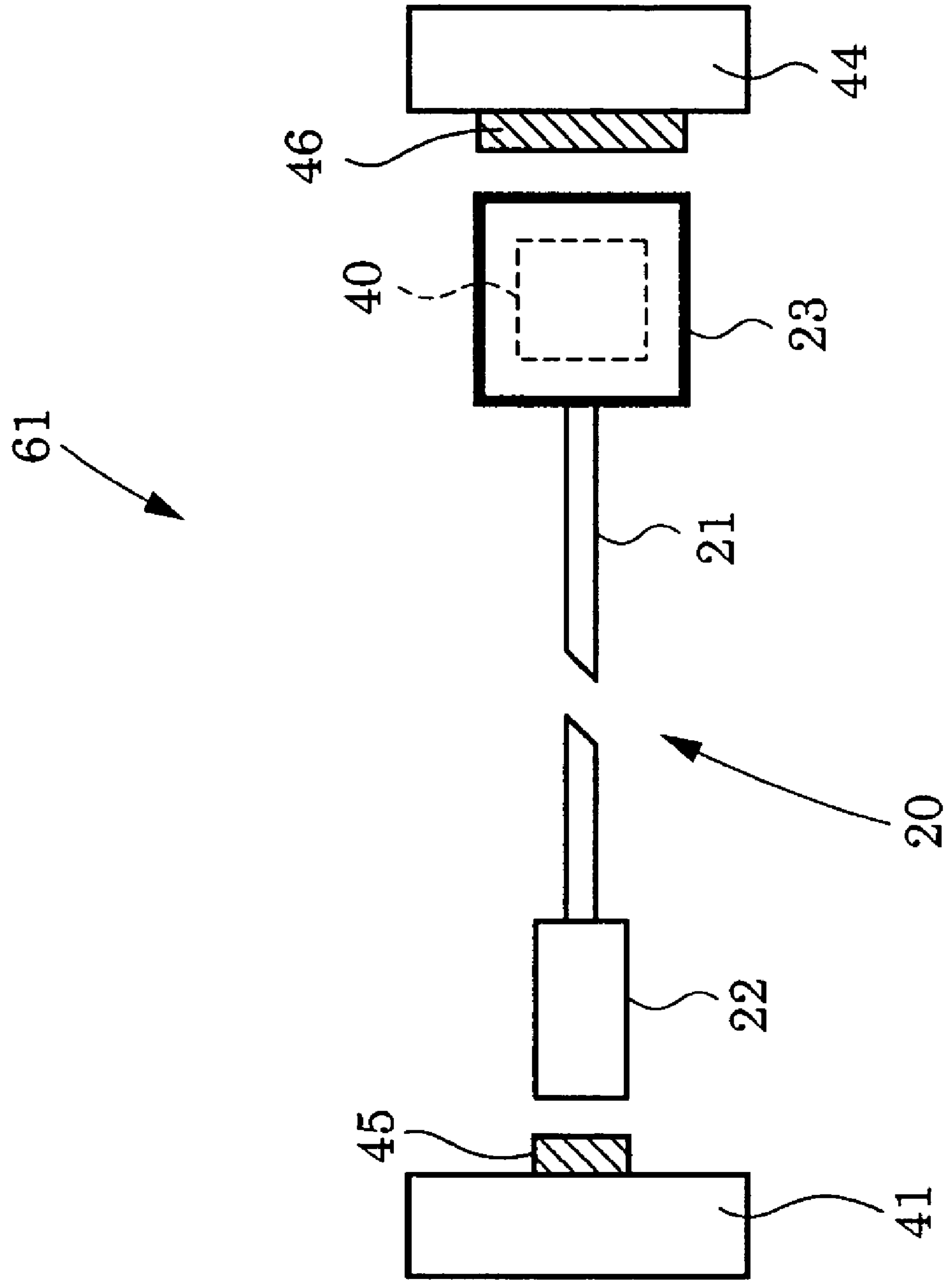
FIG. 6A to 6C are schematic diagrams of embodiments of a digital video display system according to the present invention.

FIG. 6A is a schematic diagram of a first embodiment of a digital video display system according to the present invention. A digital video display system 61 of this embodiment includes the digital signal transmission cable 20, an image input device 41 equipped with a female HDMI receptacle 45 configured to connect to the first male HDMI connector 22, and an image output device 44 equipped with a female DVI receptacle 46 configured to connect to the first male DVI connector 23 equipped with the compensation circuit 40.

Figure 6B:
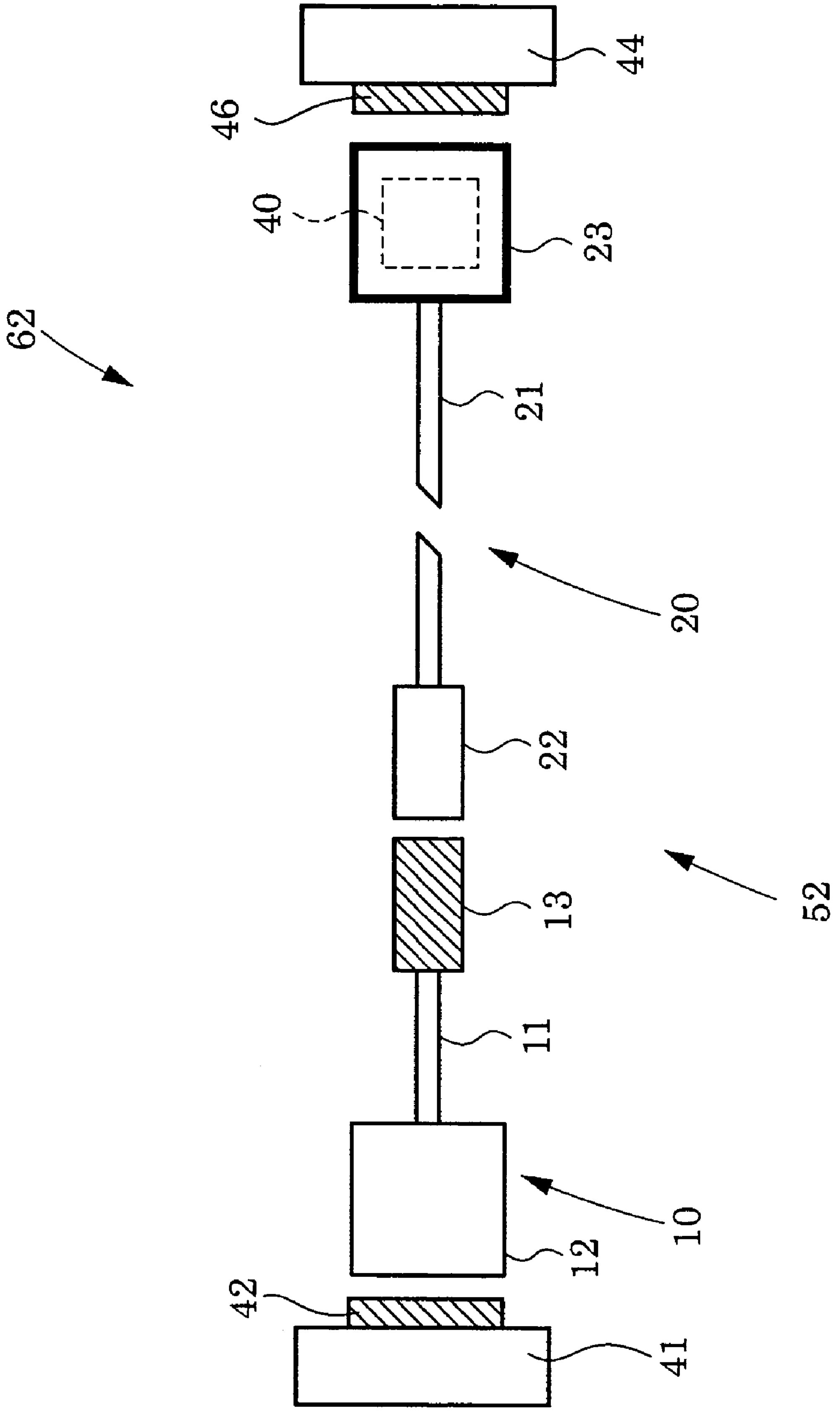

FIG. 6B is a schematic diagram of a second embodiment of a digital video display system according to the present invention. A digital video display system 62 includes the digital signal transmission cable 52 according to the present invention, a image input device 41 equipped with a female DVI receptacle 42 configured to connect to the male DVI connector 12, and an image output device 44 equipped with a female DVI receptacle 46 configured to connect to the first male DVI connector 23 equipped with the compensation circuit 40.

Figure 6C:
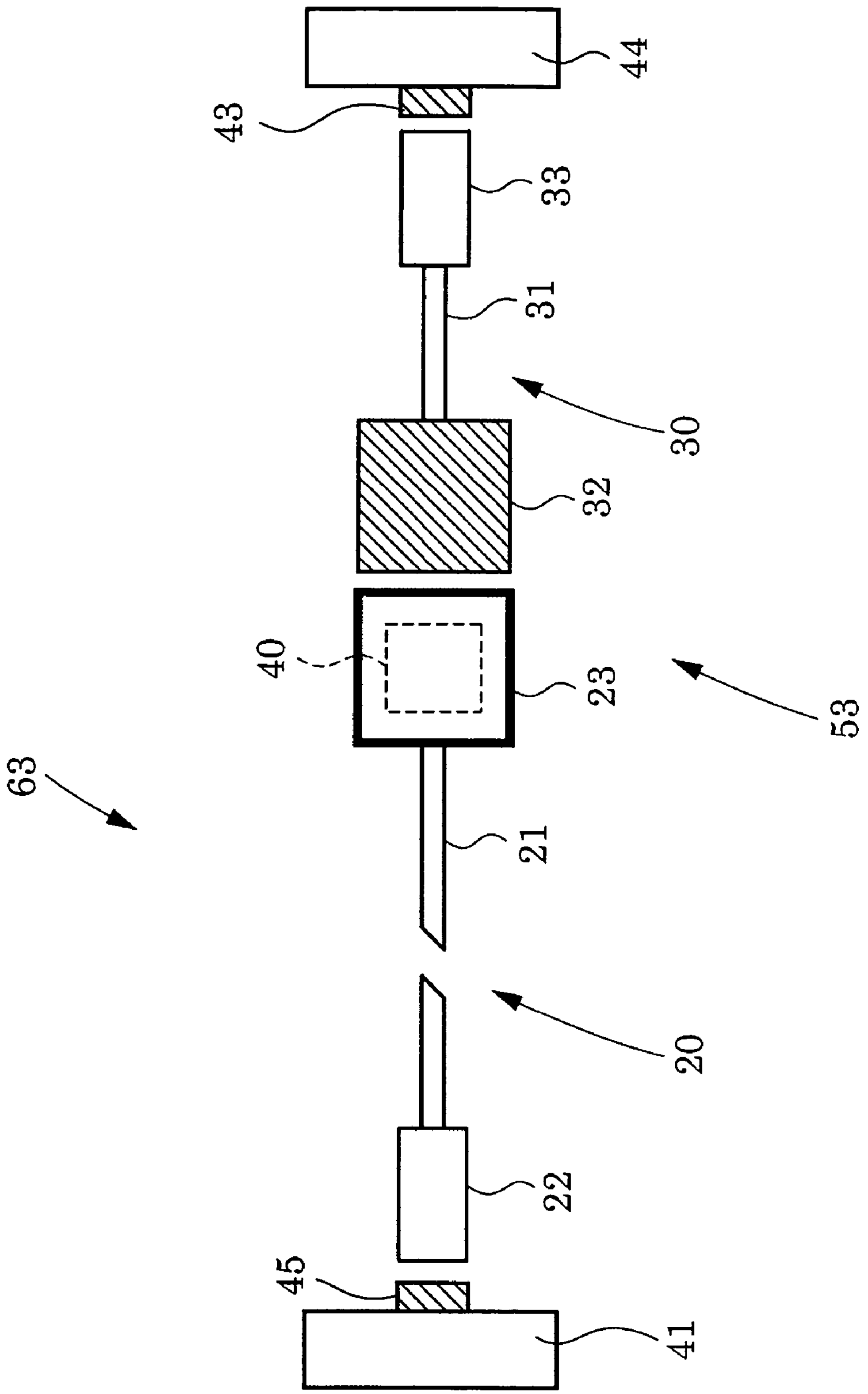

FIG. 6C is a schematic diagram of a third embodiment of a digital video display system according to the present invention. A digital video display system 63 includes the digital signal transmission cable 53 according to the present invention, an image input device 41 equipped with a female HDMI receptacle 45 configured to connect to the first male HDMI connector 22, and an image output device 44 equipped with a female HDMI receptacle 43 configured to connect to the second male HDMI connector 33 equipped with the compensation circuit 40.

Any of the digital video display system 61, 62 and 63 serves to correct distortion and attenuation of digital signals transmitted from the image input device to the image output device and, thereby, enables a clear image to be displayed without image quality deterioration even when the image output device and image input device are arranged distantly from each other.

Figure 1:
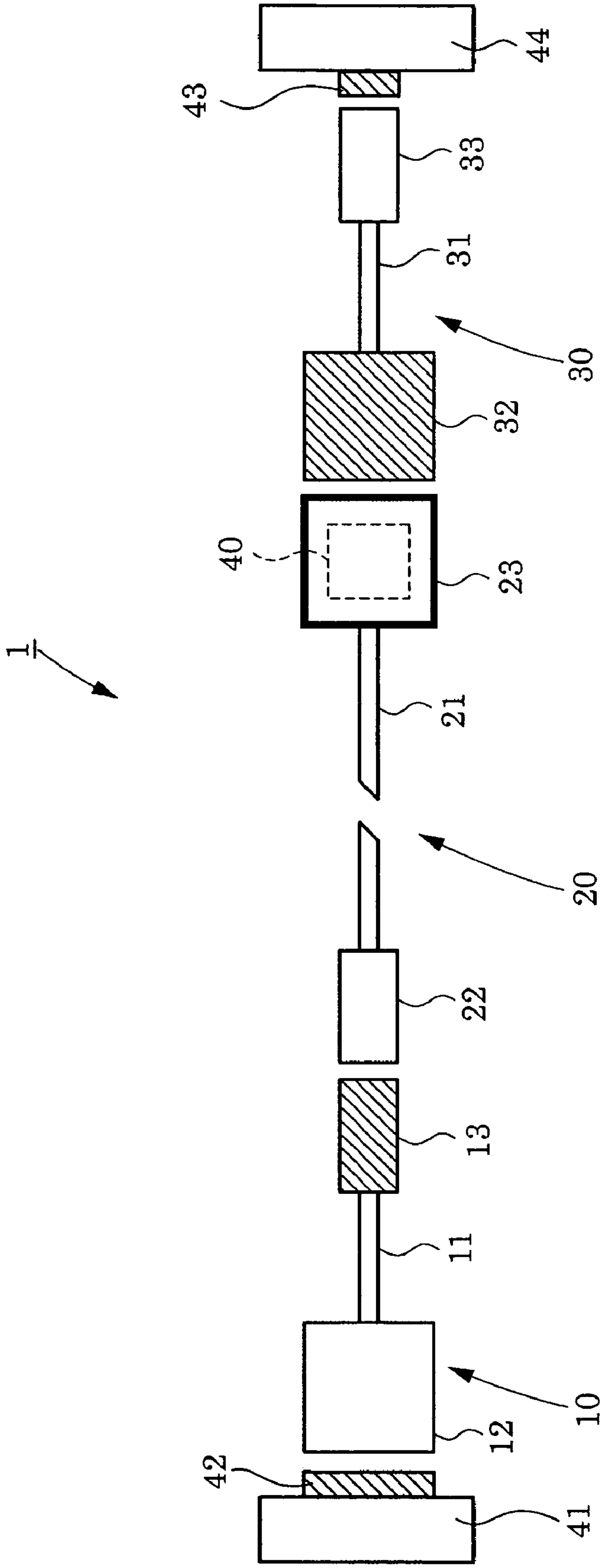
FIG. 1 is a schematic diagram of an embodiment of a digital video display system according to the present invention.

FIG. 1 is a schematic diagram of a forth embodiment of a digital video display system according to the present invention. A digital video display system 1 includes the DVI/HDMI conversion cable 10, the digital signal transmission cable 20, the DVI/HDMI conversion cable 30, an image input device 41 (e.g., a personal computer or DVD player) equipped with a female DVI receptacle 42, and an image output device 44 (e.g., a projector or liquid crystal display) equipped with a female HDMI receptacle 43.

The DVI/HDMI conversion cable 10 comprises a metal wire 11 having an insulation sheathing, a male DVI connector 12 connected to one end of the metal wire 11, and a female HDMI connector 13 connected to the other end of the metal wire 11. If the metal wire 11 is too short, the connectors 12 and 13 connected to both ends of the metal wire 11 will get in the way of each other when the cable 10 is connected to the image output device 41. Meanwhile, if the metal wire 11 is too long, distortion and attenuation of the signal will occur. Therefore, the metal wire 11 preferably has a length that is from 0.1 to 0.4 m.

Figure 4:
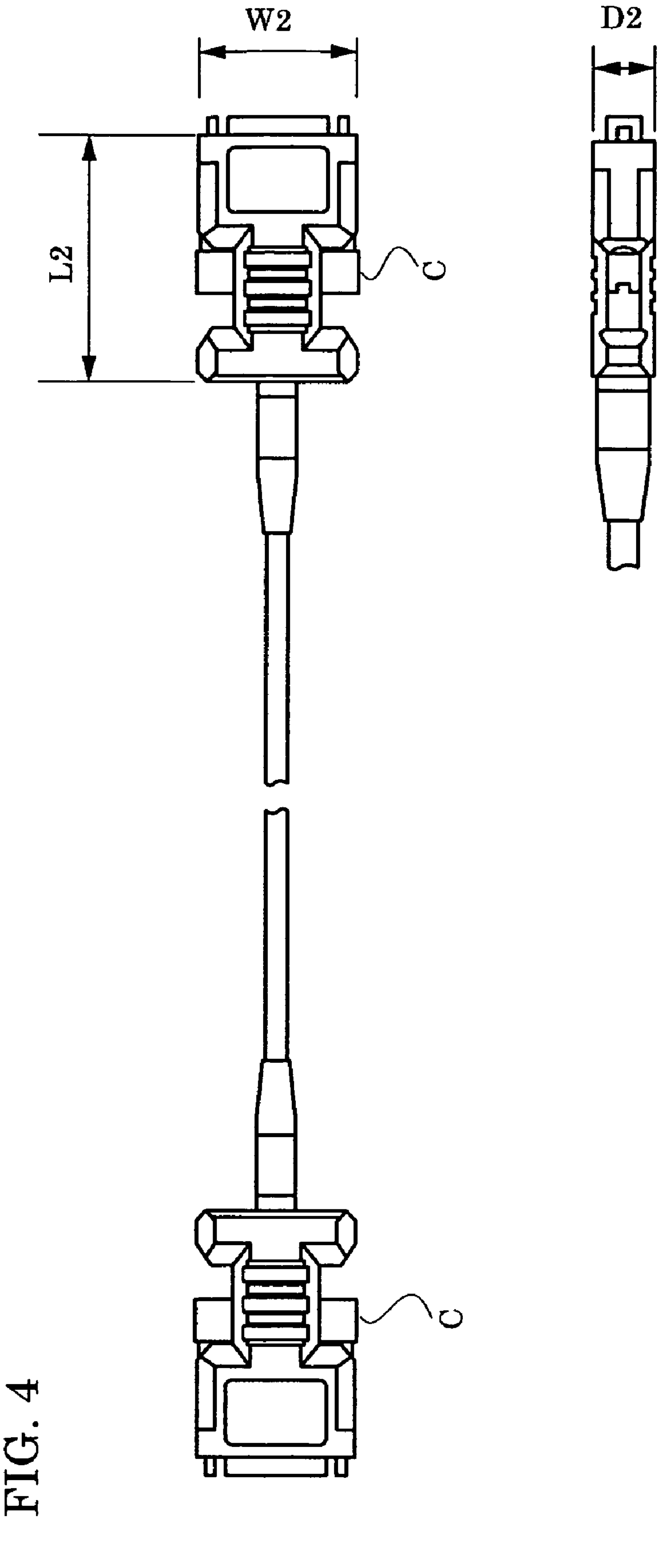
FIG. 4 is a schematic diagram of a digital signal transmission cable equipped with a conventional DVI-compliant connector.

FIG. 2 shows the digital signal transmission cable 20 in more detail. The digital signal transmission cable 20 comprises a metal wire 21 having an insulation sheathing and a length that is from 5 to 30 m, a male HDMI connector 22 connected to one end of the metal wire 21, and a first male DVI connector 23 equipped with the compensation circuit 40 connected to the other end of the metal wire 21. The male HDMI connector 22 has a width W1 of 18 mm, a thickness D1 of 10 mm, and a length L1 of 41 mm and is, thus, smaller than an example of a conventional DVI connector C (which has a width W2 of 39 mm, a thickness D2 of 15.4 mm, and a length L2 of 53 mm, see FIG. 4). By installing the digital signal transmission cable 20 with the male HDMI connector 22 at the front end, the digital signal transmission cable 20 can be passed through small-diameter conduits and narrow spaces with ease.

Figure 3:
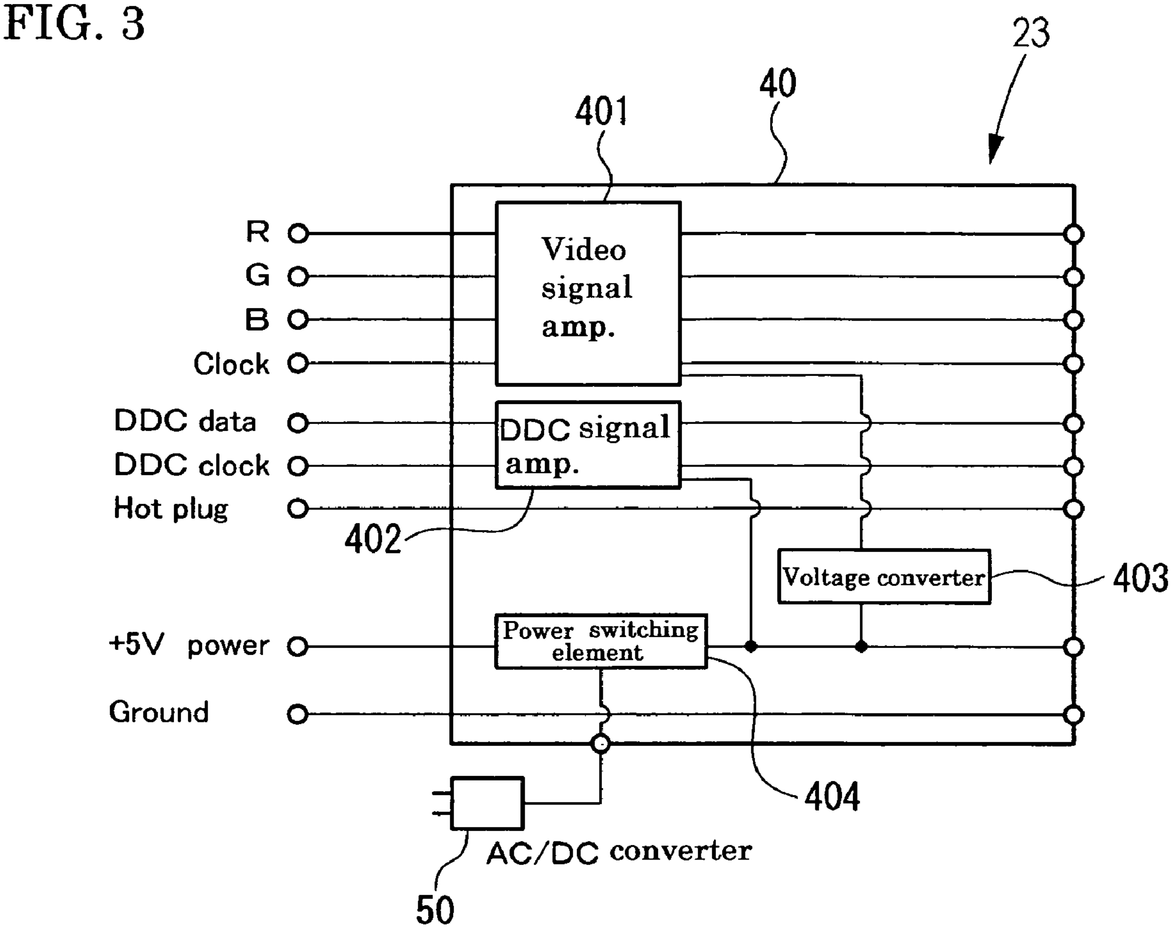
FIG. 3 is a block diagram of an embodiment of a compensation circuit installed inside a male DVI connector used in the present invention.

The compensation circuit 40 for correcting distortion and attenuation of the digital signal that occurs as it passes through the metal wire 21 is installed inside the first male DVI connector 23. FIG. 3 is a block diagram of an embodiment of the compensation circuit 40 equipped inside the first male DVI connector 23 used in the present invention. The compensation circuit 40 includes a video signal amplifier (LSI chip) 401, a display data channel (DDC) signal amplifier (LSI chip) 402, a voltage converter 403, and a power switching element 404. The video signal amplifier 401 functions both to correct distortion of the digital signal and to amplify the digital signal to a prescribed level. A MAX3815, for example, can be used as the video signal amplifier 401; MAX3815 chips are inexpensive and readily available. By using the MAX3815 as the video signal amplifier 401, increase in manufacturing cost can be held to a minimum.

The DDC signal amplifier 402 functions to execute communications based on the DVI standard between the projector, liquid crystal display, or other image output device and the personal computer, DVD player, or other image input device. More specifically, the DDC signal amplifier 402 executes the exchange of digital data called DDC signals between the image output device and the image input device such that the display capability (resolution) of the image output device is communicated to image input device and mutual authentication signals are exchanged between the image output device and the image input device in order to protect the copyrights of the image source. Shaping and amplification of the DDC signals are usually unnecessary because the transmission speed is slow (i.e., only several thousandths of the transmission speed of a video signal). However, if necessary, it is also acceptable to provide an internal LSI circuit for shaping and amplifying DDC signals.

To provide the electric power necessary for operating the image signal amplifier 401 and the DDC signal amplifier 402, the power line of a +5 V power supply compliant with the DVI standard is branched and supplied to the two amplifiers 401 and 402 so that excess +5 V power can be utilized. More specifically, since the drive voltage of the video signal amplifier 401 is often +3.3 V, a voltage converter 403 configured to convert +5 V to +3.3 V is arranged at an intermediate position along the branched power line. Meanwhile, since the excess +5 V may not be sufficient depending on the specifications of the personal computer, DVD player, or other image input device, the first male DVI connector 23 is configured such that an AC/DC converter 50 configured to covert alternating-current voltages of 100 to 240 V to a direct-current voltage of +5 V can be connected thereto.

It is difficult to control the system such that the +5 V supplied by the DVI-compliant power supply and the +5 V supplied by the AC/DC converter 50 are identical and, thus, a slight potential difference between the two is unavoidable. Consequently, if both +5 V supplies are used simultaneously, one can expect an irregular current to occur in the circuit and cause interference in the image output device (e.g., projector or liquid crystal display) and the image input device (e.g., personal computer or DVD player). In order to avoid the occurrence of such an irregular current, a power switching element 404 is provided which is configured to detect the voltage of the AC/DC converter 50 and block the connection with the DVI-compliant +5 V supply when the AC/DC converter 50 is connected.

The DVI/HDMI conversion cable 30 comprises a metal wire 31, a female DVI connector 32 connected to one end of the metal wire 31, and a male HDMI connector 33 connected to the other end of the metal wire 31. Similarly to the DVI/HDMI conversion cable 10, the length of the metal wire 31 is preferably from 0.1 to 0.4 m.

Instead of the digital signal transmission cable equipped with the cables 10, 20, and 30, it is also possible to use a digital signal transmission cable that does not include the cable 10 and/or the cable 30, depending on the formats of the image input device and image output device used. See Table 1.

TABLE 1

| Receptacle of image input device | Digital signal transmission cable | Receptacle of image output device | Reference Figure |
|---|---|---|---|
| DVI | Cable 10 + Cable 20 | DVI | FIG. 6B |
| HDMI | Cable 20 | DVI | FIG. 6A |
| DVI | Cable 10 + Cable 20 + Cable 30 | HDMI | FIG. 1 |
| HDMI | Cable 20 + Cable 30 | HDMI | FIG. 6C |

When the digital video display system 1 is installed, first the digital signal transmission cable 20 is installed (i.e., laid or run through walls, conduit, or the like) with the male HDMI connector 22 in front and without the DVI/HDMI conversion cables 10 and 30 connected. Then, afterwards, the DVI/HDMI conversion cables 10 and 30 are connected. As a result, the cable 20 can be passed through small-diameter pipes and narrow spaces with ease.

With the digital video display system 1, digital signals that have become distorted and/or attenuated while propagating through the cables can be restored to their original shapes and levels because the compensation circuit 40 configured to shape and amplify digital signals is installed inside the first male DVI connector 23. Thus, even when a cable made of metal wire is used, digital signals can be transmitted over long distances in a satisfactory manner. As a result, when digital signals are transmitted from a personal computer, DVD player, or other image input device to a projector, liquid crystal display, or other image output device not provided with an internal LSI circuit for shaping and amplifying digital signals, the distortion and attenuation of the digital signals transmitted from the image input device to the image output device can be corrected and a clear image can be displayed without image quality deterioration even if the image output device and the image input device are arranged distantly from each other.

Since the length of the metal wire 11 of the DVI/HDMI conversion cable 10 is 0.1 to 0.4 m excluding the length of the connector portions, the female HDMI connector 13 does not get in the way when the male DVI connector 12 is connected to a personal computer, DVD player, or other image input device equipped with a DVI receptacle. Also, the digital signal does not become distorted or attenuated because the metal wire 11 is not too long. Furthermore, a large degree of freedom is obtained with respect to connecting the cable 10 to image input devices because the metal wire 11 has an appropriate length. Similarly, since the length of the metal wire 31 of the other DVI/HDMI conversion cable 30 is 0.1 to 0.4 m excluding the length of the connector portions, the female DVI connector 32 does not get in the way when the male HDMI connector 33 is connected to a projector, liquid crystal display, or other image output device equipped with a HDMI receptacle and the digital signal does not become distorted or attenuated because the metal wire 31 is not too long.

By varying the combination of the three cables, i.e., the DVI/HDMI conversion cables 10 and 30 and the digital signal transmission cable 20, any combination of two DVI devices, two HDMI devices, or a DVI device and an HDMI device can be connected freely in any layout.

Figure 7:
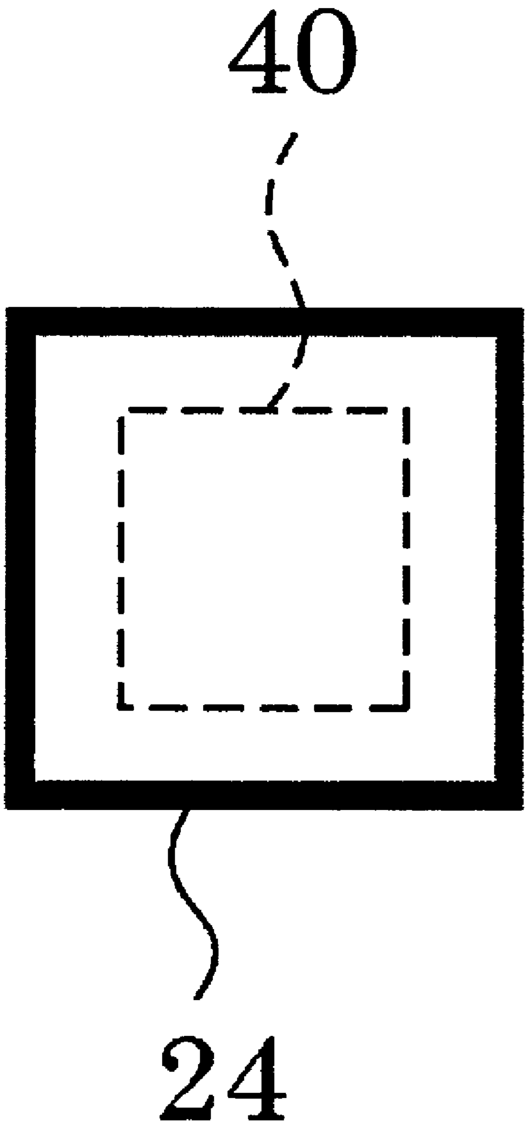
FIG. 7 is a schematic diagram of a connecting device according to the present invention.

Although in the preceding embodiment the digital signal transmission cable 20 is presented as a device having the compensation circuit 40, it is also acceptable for the compensation circuit 40 to exist as a standalone entity regardless of the existence of the cable. For example, a male DVI connecting device equipped with a compensation circuit can be provided. FIG. 7 shows a schematic view of the connecting device 24 according to the present invention. Once the connecting device 24 has been prepared, a digital signal transmission cable equivalent to the digital signal transmission cable 20 can be fabricated to any desired length by providing a metal wire and a male HDMI connector.

While this invention has been described in connection with what is currently considered to be the most practical and preferred embodiments, the invention is not limited to the disclosed embodiments but, on the contrary, is intended to cover various modifications and equivalent arrangements included within the spirit and scope of the appended claims.

The entire disclosure of the Japanese Patent Application No. 2005-116217 filed on Apr. 13, 2005—including the specification, claims, drawings, and summary—is incorporated herein by reference in its entirety.

What is claimed is:

1. A digital signal transmission cable, comprising:

a first metal wire; and a first male digital visual interface (DVI) connector compliant with Digital Display Working Group's DVI standard that is mounted to one end of the first metal wire and equipped with a compensation circuit having a video signal amplifier configured to shape and amplify digital signals that propagated through the first metal wire.

2. The digital signal transmission cable recited in claim 1, further comprising:

a first male high definition multimedia interface (HDMI) connector compliant with an HDMI standard that is mounted to the other end of the first metal wire.

3. The digital signal transmission cable recited in claim 2, further comprising:

a first DVI/HDMI conversion cable comprising a second metal wire, a second male DVI connector that is mounted to one end of the second metal wire, and a female HDMI connector compliant with the HDMI standard that is mounted to the other end of the second metal wire, the female HDMI connector being connected to the first male HDMI connector.

4. The digital signal transmission cable recited in claim 3, further comprising:

a second DVI/HDMI conversion cable comprising a third metal wire, a second male HDMI connector that is mounted to one end of the third metal wire, and a female DVI connector compliant with a DVI standard that is mounted to the other end of the third metal wire, the female DVI connector being connected to the first male DVI connector.

5. A digital video display system including the digital signal transmission cable recited in claim 4, comprising:

an image input device provided with a female DVI receptacle connected to the second male DVI connector; and an image output device provided with a female HDMI receptacle connected to the second male HDMI connector.

6. The digital signal transmission cable recited in claim 3, wherein the second metal wire has a length that is from 0.1 to 0.4 m.

7. A digital video display system including the digital signal transmission cable as recited in claim 3, comprising:

an image input device equipped with a female DVI receptacle connected to the second male DVI connector; and an image output device equipped with a female DVI receptacle connected to the first male DVI connector.

8. The digital signal transmission cable recited in claim 2, further comprising:

a second DVI/HDMI conversion cable comprising a third metal wire, a second male UDMI connector that is mounted to one end of the third metal wire, and a female DVI connector compliant with a DVI standard that is mounted to the other end of the third metal wire, the female DVI connector being connected to the first male DVI connector.

9. The digital signal transmission cable recited in claim 8, wherein the third metal wire has a length that is from 0.1 to 0.4 m.

10. The digital signal transmission cable recited in claim 6, wherein the third metal wire has a length that is from 0.1 to 0.4 m.

11. A digital video display system including the digital signal transmission cable recited in claim 8, comprising:

an image input device provided with a female HDMI receptacle connected to the first male HDMI connector; and an image output device provided with a female HDMI receptacle connected to the second male HDMI connector.

12. The digital signal transmission cable recited in claim 1, further comprising:

a second DVI/HDMI conversion cable comprising a third metal wire, a second male HDMI connector that is mounted to one end of the third metal wire, and a female DVI connector compliant with a DVI standard that is mounted to the other end of the third metal wire, the female DVI connector being connected to the first male DVI connector.

13. The digital signal transmission cable recited in claim 12, wherein the third metal wire has a length that is from 0.1 to 0.4 m.

14. A digital video display system including the digital signal transmission cable as recited in claim 2, comprising:

an image input device provided with a female HDMI receptacle connected to the first male HDMI connector; and an image output device provided with a female DVI receptacle connect to the first male DVI connector.

15. A connecting device with one end being configured to be connected to a receptacle of an image output device either directly or via a separate cable and with the other end being configured to be connected to a receptacle of an image input device either directly or via a separate cable, the connecting device comprising:

an interface that is compliant with a DVI standard; and a compensation circuit having a video signal amplifier coupled to the interface and configured to shape and amplify digital signals.

* * * * *